United States Patent
Litzenberger

(10) Patent No.: US 9,996,547 B2
(45) Date of Patent: Jun. 12, 2018

(54) PRIORITIZING CONTENT ITEM SYNCHRONIZATION BASED ON SHARING

(71) Applicant: Dropbox, Inc., San Francisco, CA (US)

(72) Inventor: Dwayne Litzenberger, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 129 days.

(21) Appl. No.: 13/950,679

(22) Filed: Jul. 25, 2013

(65) Prior Publication Data

US 2015/0032692 A1   Jan. 29, 2015

(51) Int. Cl.
G06F 17/30 (2006.01)

(52) U.S. Cl.
CPC ............... *G06F 17/30174* (2013.01)

(58) Field of Classification Search
CPC ............ G06F 17/30575; G06F 17/30067
USPC ....................................... 707/620
See application file for complete search history.

(56) References Cited

U.S. PATENT DOCUMENTS

| | | | |
|---|---|---|---|
| 6,466,980 B1 | 10/2002 | Lumelsky et al. | |
| 8,255,545 B1* | 8/2012 | Schmidt et al. | 709/227 |
| 8,527,602 B1* | 9/2013 | Rasmussen et al. | 709/207 |
| 2005/0114538 A1* | 5/2005 | Rose | 709/231 |
| 2005/0147130 A1* | 7/2005 | Hurwitz | G06F 17/30578 370/503 |
| 2006/0074750 A1* | 4/2006 | Clark et al. | 705/14 |
| 2007/0174246 A1 | 7/2007 | Sigurdsson et al. | |
| 2008/0040673 A1* | 2/2008 | Zuckerberg et al. | 715/745 |
| 2008/0049714 A1* | 2/2008 | Commarford et al. | 370/350 |
| 2008/0168526 A1* | 7/2008 | Robbin et al. | 725/139 |
| 2009/0300169 A1 | 12/2009 | Sagar et al. | |
| 2010/0174805 A1* | 7/2010 | Jones | 709/219 |
| 2014/0067929 A1* | 3/2014 | Kirigin | H04L 67/06 709/204 |

(Continued)

FOREIGN PATENT DOCUMENTS

| | | |
|---|---|---|
| WO | 2010/048324 A1 | 4/2010 |
| WO | 2012/158654 A2 | 11/2012 |
| WO | 2012/177253 A1 | 12/2012 |

OTHER PUBLICATIONS

Jeffery Bartelma, Andre Houston, Arash Ferdowsi, Jonathan Ying, Dec. 27, 2012, World Intellectual Property Organization, pp. 1-19.*

(Continued)

*Primary Examiner* — Syling Yen
*Assistant Examiner* — Allen Lin
(74) *Attorney, Agent, or Firm* — Polsinelli PC

(57) ABSTRACT

Content items queued for synchronization between a client device and a content management system can be automatically prioritized to improve the sharing process. That is, the content items can be prioritized based on whether a share link has been created to the content item. A share link can enable a user to access the shared content item from a content management system. Content items that have been shared using a share link can be given higher priority to be synchronized prior to content items that have not been shared. The queued content items can be synchronized in the synchronization order resulting from the prioritization. Further, multiple shared content items queued for synchronization can be sub-prioritized based on one or more sub-prioritization criteria.

14 Claims, 4 Drawing Sheets

(56) References Cited

U.S. PATENT DOCUMENTS

2014/0067997 A1* 3/2014 Saabas .................... H04L 47/22
709/217

OTHER PUBLICATIONS

"Introduction to Sync Framework Database Synchronization", Microsoft 4, Jul. 2013 (Jul. 4, 2013), XP002729916, Retrieved from the Internet: URL:https://web.archive.org/web/20130704012626/http://msdn.microsoft.com/en-us/sync/bb887608.aspx [retrieved on Sep. 17, 2014].

Simon Brew: "Top 10 tips to get the most out of Dropbox", ITPRO ,Mar. 2, 2012 (Mar. 2, 2012), XP002729917, Retrieved from the Internet: URL:http://www.itpro.co.uk/639331/top-10-t_ips-to-get-the-most-out-of-dropbox/page/0/_1 [retrieved on Sep. 17, 2014].

"Bittorrent prioritize torrents for uploading", superuser.com, Apr. 24, 2012 (Apr. 24, 2012), XP002729918, Retrieved from the Internet: URL:http://superuser.com/questions/416112/bittorrent-prioritize-torrents-for-uploading [retrieved on Sep. 18, 2014].

International Search Report dated Sep. 30, 2014, issued in corresponding International Application No. PCT/US2014/045360.

* cited by examiner

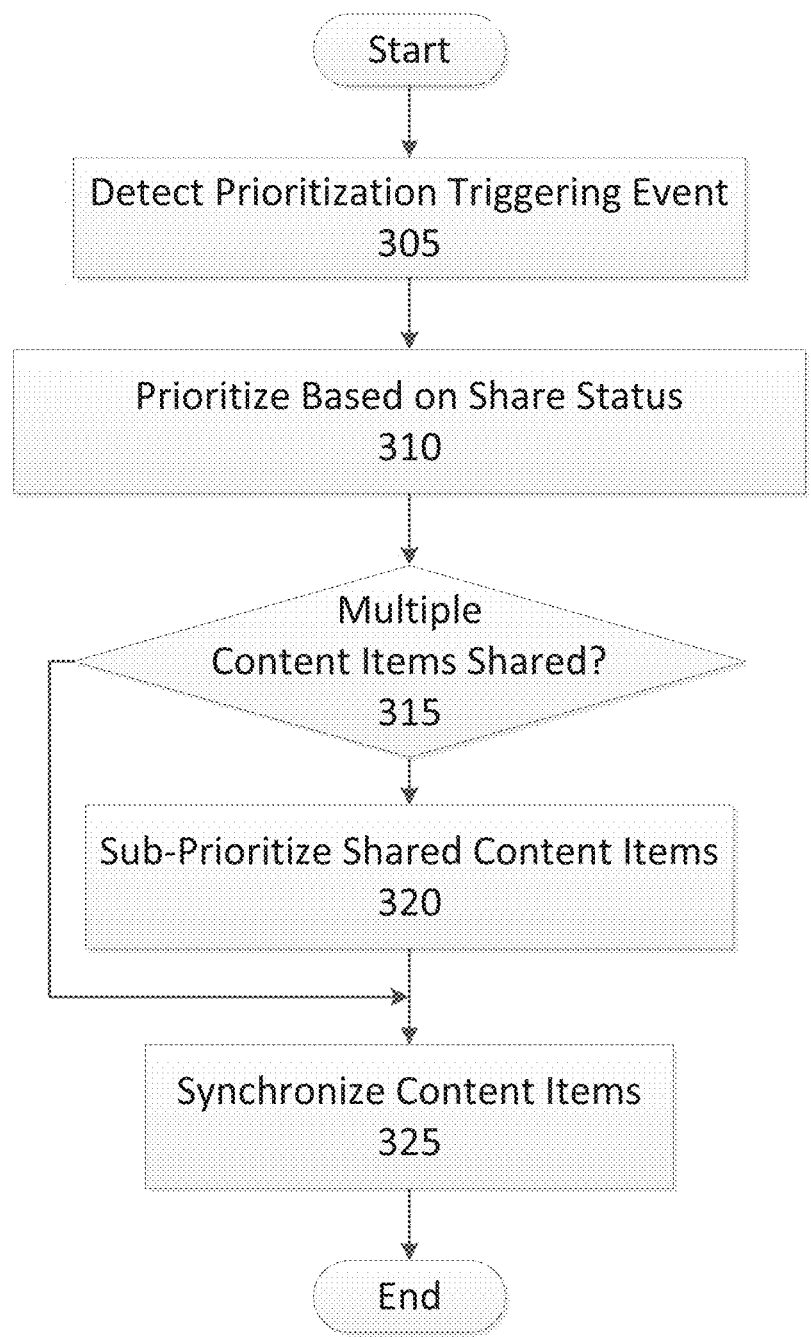

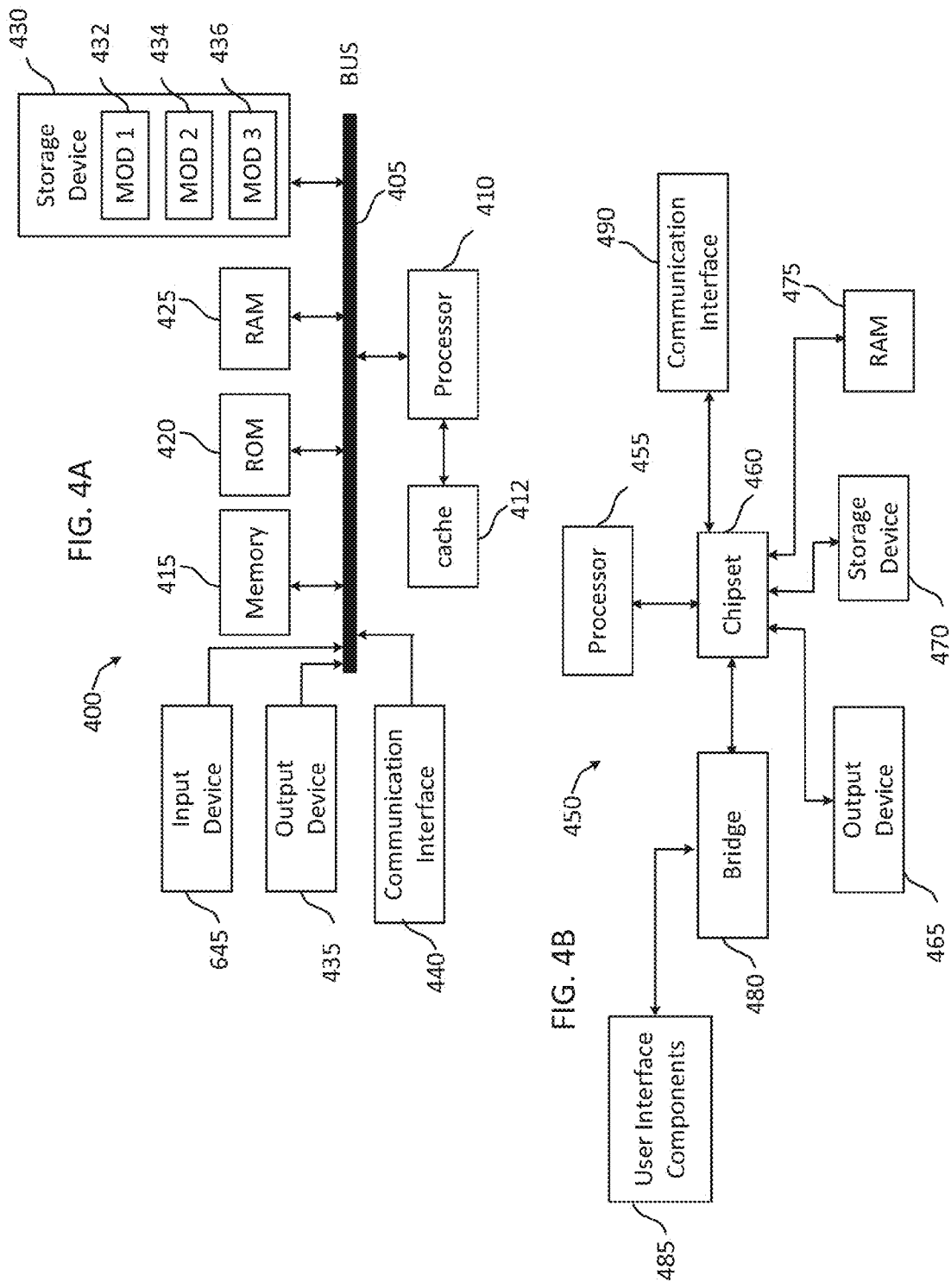

PRIORITIZING CONTENT ITEM SYNCHRONIZATION BASED ON SHARING

TECHNICAL FIELD

The present technology pertains to online content item storage, and more specifically pertains to prioritizing synchronization of content items between a content management system and a client device based on content item sharing.

BACKGROUND

Cloud storage accounts allow users to store their content items in an online storage account that can be accessed from any computing device with a network connection. Users can thus upload content items such as pictures, songs, documents, etc. from a computing device to their online storage account and later access the content items from different computing devices.

While online storage accounts allow users to easily access their synchronized content items, synchronizing the content items themselves can be time consuming. For example, a user can have numerous content items stored on their client device, which can lead to a lengthy synchronization time. Further, mobile client devices such as smart phones may require a high speed connection to synchronize content item with their online storage account, further increasing the time required to synchronize content items.

Conventional content item synchronization methods queue content items and synchronize them one at a time. A common way to create the queue is based on a simple directory traversal to identify unsynchronized content items. In some cases, a user cannot share a content item until the content item has been synchronized to the content management service. When the user attempts to share and/or access a shared content item before it is synchronized with the content management system, the user is presented with an error message. The user then has to repeat the request until it succeeds. For example, a recipient user may have to repeatedly refresh a web page until the shared content item is available. This can lead to user frustration and, in some cases, abandonment of the service entirely. Accordingly, an improved method of uploading content items is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatic prioritization of content items queued for synchronization between a content management system and a client device. Synchronization can include uploading content items from the client device to the content management system or, alternatively, downloading content items from the content management system to the client device, to result in synchronized content libraries on both the client device and the content management system. For example, the client device can be configured to synchronize content items stored on the client device with an associated account on the content management system by uploading content items stored on the client device to a content management system. The uploaded content items can then be assigned to the associated account.

The client device can be configured to prioritize the content items queued for synchronization to the content management system to optimize the sharing process. That is, a content item can be prioritized in the queue based on its sharing status. For example, the client device can be configured to allow a user to share a content item by creating or requesting a share link that provides a recipient user with access to the content item stored on the content management system. If a user attempts to create a share link to a content item in the queue, and the content item has not yet been synchronized with the content management system, the content item can be reprioritized to move it to the beginning of the queue. This can give the shared content item higher priority to ensure that it will be synchronized as quickly as possible, resulting in the share link providing access to the shared content item. Additionally, when synchronizing from the content management system to a client device, the system can prioritize content items shared with the user of the client device over non-shared content.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 shows an exemplary method embodiment of prioritizing content items queued to be synchronized; and FIGS. 4A and 4B exemplary possible system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatic re-prioritization of content item queued for synchronization between a content management system and a client device. For example, a client device can be configured to synchronize content items stored on the client device with an associated account on the content management system. To accomplish this, the client device can upload content items stored on the client device to a content management system. The uploaded content items can then be assigned to the associated account.

The client device can be configured to prioritize the content items queued for synchronization with the content management system to optimize the sharing process. That is, a content item can be prioritized in the queue based on its sharing status. For example, the client device can be configured to allow a user to share a content item by creating or requesting a share link that provides a recipient user with access to the content item stored on the content management system. If a user attempts to create a share link to a content item in the queue, and the content item has not yet been synchronized with the content management system, the content item can be reprioritized to move it to the beginning of the queue. This can give the shared content item higher priority to ensure that it will be synchronized as quickly as possible, at which point the share link can successfully provide access to the shared content item. Additionally, when synchronizing from the content management system to a client device, the system can prioritize content items shared with the user of the client device over non-shared content.

Figure 1:
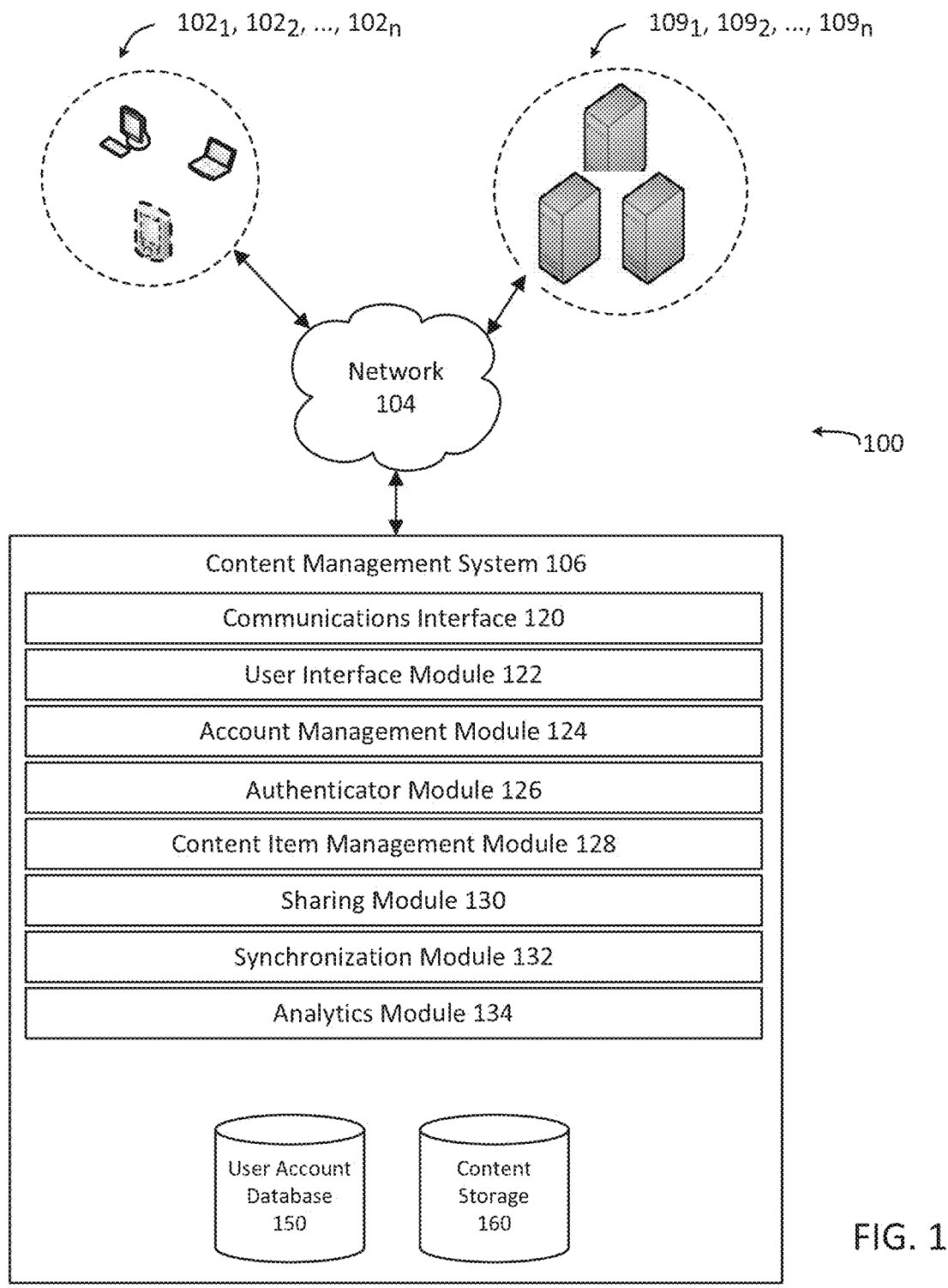
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 and client devices 102 are presented with specific components, it should be understood by one skilled in the art, that the architectural configuration presented is simply one possible configuration and that other configurations with more or less components are also possible. For example, in some embodiments, client devices 102 can be configured to prioritize content items queued to be uploaded to content management system 106.

Figure 2:
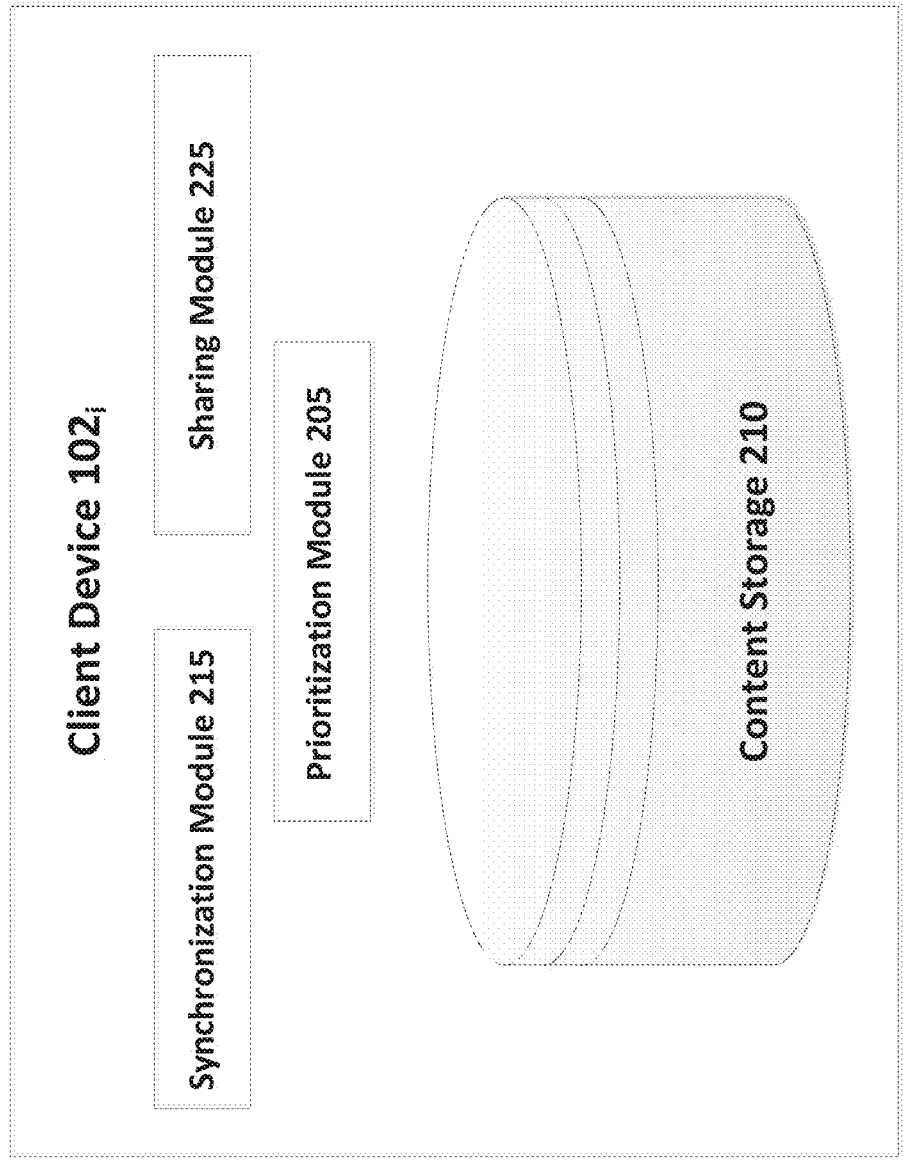
FIG. 2 shows an exemplary embodiment of a client device configured to prioritize content items queued to be synchronized with a content management system.

FIG. 2 shows an exemplary embodiment of client device $102_i$ configured to prioritize content items queued to be synchronized with content management system 106. As shown, client device $102_i$ can include content storage 210 configured to store content items. Client device $102_i$ can further include synchronization module 215 configured to synchronize content items stored in content storage 210 with content management system 106. Synchronization module 215 can be configured to communicate with content storage 210 to access content items to identify content items that have not been synchronized with content management system 106 and to upload the identified content items to content management system 106.

Upon identifying unsynchronized content items, synchronization module 215 can be configured to upload the content item to content management system 106. In some embodiments, synchronization module 215 can begin upload of an unsynchronized content item immediately upon identifying the content item as having not been synchronized with content management system 106.

Alternatively, in some embodiments, synchronization module 106 can be configured to limit the number of concurrent content item uploads to content management system 106. For example, synchronization module 215 can be configured to upload only one content item at a time such that when upload of one content item completes, upload of a next content item begin. Alternatively, in some embodiments, synchronization module 215 can be configured to concurrently upload up to 2, 3, 4, etc., content items.

In some embodiments, synchronization module 215 can queue content items identified as being unsynchronized with content management system 106. For example, upon identifying an unsynchronized content item, synchronization module 215 can add the content item to a synchronization queue of content items to be uploaded to content management system 106. The synchronization queue can be stored in content storage 210. To add a content item to the synchronization queue, in some embodiments, synchronization module 215 can add an identifier associated with the content item to the synchronization queue. The identifier can then be used to locate the content item in content storage 210.

In some embodiments, the content items in the synchronization queue can be uploaded in the order in which they are received. Alternatively, in some embodiments, the content items in the synchronization queue can be uploaded in reverse order, such that the content item most recently added to the synchronization queue is uploaded first.

In some embodiments, client device $102_i$ can be configured to prioritize the content items in the synchronization queue to optimize the sharing process. For example, the content items can be prioritized based on sharing status, such as non-shared and shared. To accomplish this, client device $102_i$ can include prioritization module 205 configured to prioritize content items queued for synchronization with content management system 106. That is, prioritization module 205 can be configured to prioritize the queued content items based on whether a sharing link has been created to the content item. For example, client device $102_i$ can include sharing module 225 that can be configured to share a content item by creating or requesting a share link that can provide a recipient user with access to the shared content item stored on content management system 106. The recipient user will not be able to access the shared content item using the created share link until the content item is synchronized with content management system 106. Accordingly, queued content items that have been shared can be considered to be of higher priority. Prioritization module 205 can be configured to prioritize the queued content items to give priority to content items that have an associated share link.

In some embodiments, sharing module 225 can be configured to store a share link to a content item in a temporary storage on client device $102_i$, such as a clipboard, upon creation of the share link. This can enable a user to easily paste the share link into an email, social web post, instant message, text message, etc. Each time a new share link is created, sharing module 225 can be configured to store the newly created share link in the temporary storage, and thus overwrite whatever data was previously stored in the temporary storage. In this type of embodiment, synchronizing the most recent content item shared can be of high important because the share link is stored in the temporary storage and is likely to be shared by the user. Thus, in some embodiments, prioritization module 205 can be configured to give the highest priority to the content item that was most recently shared, resulting in the content item being uploaded prior to all other content items in the synchronization queue.

When the synchronization queue contains multiple content items with a shared share status, prioritization module 205 can be configured to perform a sub-prioritization of just the shared content items. In some cases, the shared content items can be prioritized based on the order in with they were shared. For example, a first shared content item can have a higher priority in the synchronization queue than a second shared content item when the share request to create a share link to the first shared content item was received prior to a second share request to create a share link to the second shared content item. The shared content items can also be prioritized based on one or more other factors, such as content item size, content item type, current location, network connection, current time, content item source, etc.

In some embodiments, prioritization module 205 can be configured to sub-prioritize the queued shared content items based on the size of the content items. For example, the shared content items can be prioritized to be uploaded to content management system from the smallest content item to the largest content items. Prioritizing shared content items to be uploaded from the smallest content item to largest content item can maximize the number of the shared content items synchronized with content management system 106 initially. Alternatively, in some embodiments, the queued shared content items can be prioritized to be uploaded to content management system 106 from the largest content item to the smallest content item. In this type of embodiment, large shared content items, which may be more important to a user, can be given priority and synchronized with content management system 106 prior to smaller content items, which may be of lesser importance.

In some embodiments, prioritization module 205 can be configured to sub-prioritize the queued shared content items based on the content type of the content items. For example, content item types that are considered to be more important can be queued to be uploaded prior to content item types thought to be less important. Thus, in some embodiments, prioritization module 205 can be configured to sub-prioritize content items such as text documents to be uploaded prior to content items such as pictures. Alternatively, in some embodiments, content items such as pictures can be prioritized to be uploaded prior to content items such as text documents.

In some embodiments, prioritization module 205 can be configured to sub-prioritize the queued shared content items based on location. For example, content items can be prioritized based on the location of client device $102_i$ when the content item was queued for synchronization with content management system 106 or shared. Thus, prioritization module 205 can be configured to sub-prioritize shared content items queued when client device $102_i$ is located within a predetermined distance from a location known to be the user's work address to be uploaded prior to shared content items queued when client device $102_i$ is not located within the predetermined distance from the location known to be the user's work address. Alternatively, prioritization module 205 can be configured to sub-prioritize content items queued when client device $102_i$ is located within a predetermined distance from a location known to be the user's home address to be uploaded prior to content items queued when client device $102_i$ is not located within the predetermined distance from the location known to be the user's home address.

Alternatively, in some embodiments, prioritization module 205 can be configured to vary sub-prioritization of the shared content items based on the location of client device $102_i$. For example, prioritization module 205 can be configured sub-prioritize the queued content items differently when client device $102_i$ is within a predetermined distance of a specified location, such as the user's work office or home. For example, prioritization module 205 can be configured to sub-prioritize the queued content items to give higher priority to work related content items when client device $102_i$ is located within a predetermined distance from a location known to be the user's work office. Therefore, traditional work related shared content items such as spreadsheets and documents can be sub-prioritized to be uploaded prior to traditional personal content items such as photographs, songs and video. Alternatively, prioritization module 205 can be configured to sub-prioritize the shared content items to give higher priority to personal content items when client device $102_i$ is located within a predetermined distance from a location known to be the user's home.

In some embodiments, prioritization module 205 can be configured to sub-prioritize the shared content items based on a network connection being used by client device $102_i$. For example, prioritization module 205 can be configured to give higher priority to smaller shared content items when the network connection is a slower network connection such as 3G. Alternatively, prioritization module 205 can be configured to give higher priority to larger shared content items when the network connection is a faster network connection such as Wi-Fi.

In some embodiments, prioritization module 205 can be configured to sub-prioritize the shared content items based on the time. For example, shared content items considered to be personal content items can be given higher priority during traditional non-working hours. Thus, during the weekends and at nights, prioritization module can give higher priority to shared content items such as photographs, music, etc. Alternatively, prioritization module 205 can be configured to give higher priority to work related shared content items during traditional working hours. Thus, shared content items such as spreadsheets, text documents, content items assigned to a work storage account, etc., can be given higher priority during the weekdays from 8 am to 5 pm.

As another example of prioritizing content items based on time, in some embodiments, prioritization module 205 can be configured to give higher priority to smaller shared content items during the day and give priority to larger shared content items at night. This can maximize the number of content items that are synchronized while the user is awake and further gives priority to larger content items at night when the user is likely sleeping and client device $102_i$ is more likely to have a consistent network connection available.

In some embodiments, prioritization module 205 can be configured to sub-prioritize the shared content items based on a source of the content items. A content item source can identify the location, client device, application, etc., that created or modified the content item. Thus, in some embodiments, prioritization module 205 can be configured to sub-prioritize the queued shared content items to give higher priority to content items created on a user's work client device and lower priority to content items created on the user's personal client device. Alternatively, prioritization module 205 can be configured to sub-prioritize the queued shared content items to give higher priority to content items created on the user's personal client device and lower priority to content items created on the user's work client device. In some embodiments, the sub-prioritization of the content items can vary based on the location of client device $102_i$. For example, content items created on the user's personal client device can be given higher priority when client device $102_i$ is within a predetermined distance from a location known to be the user's home. Alternatively, content items created on the user's work client device can be given higher priority when client device $102_i$ is within a predetermined distance from a location known to be the user's work office.

To sub-prioritize queued shared content items, in some embodiments, contextual metadata, such as time, location, network connection, etc. can be gathered from client device $102_i$. For example, the network connection available to client device $102_i$ can be gathered from a communications interface of client device $102_i$. As another example, the current time can be gathered from an internal clock of client device $102_i$ and the location can be gathered from a GPS component of client device $102_i$. Prioritization module 205 can use the gathered content item metadata and/or contextual metadata to prioritize the content items as described above.

In some embodiments, prioritization module 205 can be configured to prioritize only the queued content items, such that any content item being uploaded during the prioritization process will not be affected by the prioritization. Thus, only the order of the content items queued will be affected by the prioritization process and any content items being synchronized, i.e. uploaded to content management system 106, will continue to be synchronized.

Alternatively, in some embodiments, prioritization module 205 can be configured to prioritize the queued content items, including any content items being synchronized. For example, prioritization module 205 can be configured to gather content item metadata describing the queued content items and any content items being synchronized with content management system 106. Prioritization of the content items will thus affect the queued content items and the content items being synchronized with content management system 106. For example, upload of any content item can be paused while the content items are prioritized/sub-prioritized, and, based on the resulting prioritization, the paused uploads can be either resumed or canceled.

While prioritizing synchronization of content items based on the share status of the content items has been discussed in regards to content items queued for upload from client device $102_i$ to content management system 106, this is just one example and is not meant to be limiting. In some embodiments, content items queued to be downloaded or synchronized to client device $102_i$ from content management system 106 can be prioritized based on the share status of the content items. For example, content management system 106 can be configured to synchronize content items assigned to a user account on content management system 106 with content items stored on client device $102_i$. Content items stored on content management system 106 can be downloaded to client device $102_i$ to synchronize the user account on content management system 106 and client device $102_i$.

In some embodiments, content items shared with a user can be added to the user's account on content management system 106. For example, a shared content item can be presented along with a user interface element enabling a user to add the shared content item to the user's user account. Selection of the user interface element can result in the content item being assigned to the user's account on content management 106.

Content items queued to be synchronized from content management system 106 to client device $102_i$ can be prioritized based on the share status of the content item, as discussed above. For example, content management system 106 can include a prioritization module, similar to prioritization module 205 on client device $102_i$, configured to prioritize synchronization of content items from content management system 106 to client device $102_i$.

FIG. 3 shows an exemplary method embodiment of prioritizing synchronization of content items queued for synchronization between a client device and a content management system. Although specific steps are show in FIG. 3, in other embodiments a method can have more or less steps.

As shown, the method begins at block 305 where a prioritization triggering event is detected. A prioritization triggering event can be an event indicating that the queued content items should be prioritized. For example, a prioritization triggering event can include a new content item being queued to be uploaded to the content management system or downloaded to the client device, a share link to a content item being requested or created, a predetermined amount of time elapsing since the content items were last prioritized, a change in location of the client device, etc.

Upon detecting a prioritization triggering event, the method continues to block 310 where the queued content items are prioritized based on the share status of each queued content item. For example, content items that have been shared can be given higher priority than content items that have not been shared. A shared content item can include a content item that a user has created a share link to so that the content items can be shared with others. Alternatively, a shared content item can be a content item that has been received via a share link from another user.

The method then continues to block 315 where it is determined whether there are multiple queued content items that have been shared. If at block 315 there are multiple queued content items that have been shared, the method continues to block 320 where the shared content items are sub-prioritized based on one or more criteria. For example, the shared content items can be sub-prioritized based on location, size, upload order, content item type, share order, etc.

The method then continues to block 325 where the content items are synchronized according to the prioritization and sub-prioritization of the queued content items.

If at block 315 it is determined that there are not multiple shared content items queued for synchronization, the method continues to block 325 where the content items are synchronized according to the prioritization performed at block 310. The method then ends.

FIG. 4A and FIG. 4B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
identifying, by a client device, a plurality of content items queued for synchronization with a content management system according to a first synchronization order dictating synchronization based on a share status of the plurality of content items, wherein a subset of the plurality of content items have the share status and the subset of the plurality of content items with the share status are synchronized prior to content items with no share status;
determining, by the client device, a second synchronization order within the subset of the plurality of content items with the share status based on a sub-prioritization criteria for a first content item and at least one second content item, wherein the sub-prioritization criteria includes when the first content item and at least one second content item were shared, a size, a type, a current location, a network connection, a current time, or a source of the first content item and at least one second content item;
prioritizing synchronization of the first content item and the at least one second content item based on the first content item having a first share status indicating that a share link to the first content item has been requested by the client device and the second content item having a second share status indicating that a share link to the at least one second content item has been requested by the content management system; and
synchronizing, by the client device, the plurality of content items with the content management system according to the first and second synchronization orders, wherein the second synchronization order includes uploading the first content item and the at least one second content item from the client device to the content management system.

2. The method of claim 1, wherein:
the first share status further indicates whether the share link to the first content item was shared with a user account associated with the client device,
the second share status further indicates whether the share link to the at least one second content item was shared with the user account associated with the client device, and
at least one second content item with the content management system according to the first and second synchronization orders.

3. The method of claim 1, wherein determining the second synchronization order includes:
when the first share status indicates that a share link to the first content item has been requested and the second share status indicates that a share link to the second content item has been requested, prioritizing the first content item and the second content item based on at least one further sub-prioritization criteria.

4. The method of claim 1, wherein prioritizing the content items based on the further sub-prioritization criteria includes:
comparing the first content item size of the first content item with the second content item size of the second content item; and
when the first content item size is larger than the at least one second content item size, prioritizing synchronization of the second content item to begin prior to synchronization of the first content item.

5. The method of claim 1, wherein prioritizing the content items based on the further sub-prioritization criteria includes:
comparing the first sharing request time of the first content item with the second sharing request time of the second content item; and
when the second sharing request time is earlier in time than the first sharing request time, prioritizing synchronization of the second content item to begin prior to synchronization of the first content item.

6. The method of claim 1, further comprising:
prior to determining the second synchronization order, pausing synchronization of the first content item; and
after determining the second synchronization order, cancelling synchronization of the first content item.

7. A computing device comprising:
a processor; and
a memory containing instructions that, when executed, cause the processor to:
identify a plurality of content items queued for synchronization with a content management system according to a first synchronization order dictating synchronization based on a share status of the plurality of content items, wherein a subset of the plurality of content items have the share status and the subset of the plurality of content items with the share status are synchronized prior to content items with no share status;
determine a second synchronization order within the subset of the plurality of content items with the share status based on a sub-prioritization criteria for a first content item and at least one second content item, wherein the sub-prioritization criteria includes when the first content item and at least one second content item were shared, a size, a type, a current location, a network connection, a current time, or a source of the first content item and at least one second content item;
a first share status that indicates that a share link to the to the first content item has been requested by the client device, and the second content item having a second share status that indicates that a share link to the second content item has been requested by the content management system; and
synchronize the plurality of content items with the second computing device according to the first and second synchronization orders, wherein the second synchronization order includes uploading the first content item and the at least one second content item from a client device to the content management system and then the first synchronization order includes uploading the content items with no share status.

8. The computing device of claim 7, wherein determining the second synchronization order includes:
when the first share status indicates that a share link to the first content item has been requested and the second share status indicates that a share link to the at least one second content item has been requested, prioritizing the first content item and the at least one second content item based on at least one further sub-prioritization criteria.

9. The computing device of claim 8, wherein the sub-prioritization criteria is a first content item size of the first content item and a second content item size of the at least one second content item, and prioritizing the content items based on the sub-prioritization criteria includes:
comparing the first content item size with the at least one second content item size; and
when the first content item size is larger than the at least one second content item size, prioritizing synchronization of the second content item to begin prior to synchronization of the first content item.

10. The computing device of claim 8, wherein the further sub-prioritization criteria is a sharing request time of the first content item and the at least one second content item and prioritizing the content items based on the sub-prioritization criteria includes:
comparing a first sharing request time of the first content item with a second sharing request time of the at least one second content item; and
when the second sharing request time is earlier in time than the first sharing request time, prioritizing synchronization of the at least one second content item to begin prior to synchronization of the first content item.

11. A non-transitory computer-readable medium containing instructions that, when executed by a computing device, cause the computing device to:
identify a plurality of content items and queued for synchronization with a content management system according to a first synchronization order dictating synchronization based on a share status of the plurality of content items, wherein a subset of the plurality of content items have the share status and the subset of the plurality of content items with the share status are synchronized prior to content items with no share status;
determine a second synchronization order within the subset of the plurality of content items with the share status based on a sub-prioritization criteria for a first content item and at least one second content item, wherein the sub-prioritization criteria includes when the first content item and at least one second content item were shared, a size, a type, a current location, a network connection, a current time, or a source of the first content item and at least one second content item;
prioritizing synchronization of the first content item and the at least one second content item based on the first content item having a first share status indicating that a share link to the first content item has been requested by the client device and the second content item having a second share status indicating that a share link to the at least one second content item has been requested by the content management system; and
synchronize the plurality of content items with the content management system according to the first and second synchronization order, wherein the second synchronization order includes uploading the first content item and the at least one second content item from the client device to the content management system and then the first synchronization order includes uploading the content items with no share status.

12. The non-transitory computer-readable medium of claim 11, wherein determining the second synchronization order includes:
when the first share status indicates that a share link to the first content item has been requested and the second share status indicates that a share link to the second content item has been requested, prioritizing the first content item and the second content item based on at least one further sub-prioritization criteria.

13. The non-transitory computer-readable medium of claim 12, wherein the further sub-prioritization criteria includes a first content item type of the first content item, a second content item type of the at least one second content item and a current location of the computing device, and prioritizing the content items based on the further sub-prioritization criteria includes:
determining that the first content item type is a personal content item and the at least one second content item type is work content item;
when a current location of the computing device is within a predetermined distance of a home address of a user of the computing device, prioritizing synchronization of the first content item to begin prior to synchronization of the at least one second content item; and
when the current location of the computing device is within a predetermined distance of a work address of the user of the computing device, prioritizing synchronization of the at least one second content item to begin prior to synchronization of the first content item.

14. The non-transitory computer-readable medium of claim 12, wherein the further sub-prioritization criteria is at least one of content item type, location of the computing device, current time, sharing request time, synchronization queue order, current network connection or content item source.

* * * * *